Aug. 31, 1926.

G. W. PRATHER 1,598,009

DEVICE FOR TESTING WHEEL TOE-IN

Filed Jan. 13, 1926       2 Sheets-Sheet 1

INVENTOR
*G. W. Prather*

BY
ATTORNEY

Aug. 31, 1926.

G. W. PRATHER 1,598,009

DEVICE FOR TESTING WHEEL TOE-IN

Filed Jan. 13, 1926    2 Sheets-Sheet 2

INVENTOR
G. W. Prather
BY
ATTORNEY

Patented Aug. 31, 1926.

1,598,009

UNITED STATES PATENT OFFICE.

GEORGE W. PRATHER, OF SANTA CRUZ, CALIFORNIA.

DEVICE FOR TESTING WHEEL TOE-IN.

Application filed January 13, 1926. Serial No. 80,946.

REISSUED

This invention relates to improvements in means for testing the toe-in of the front wheels of automobiles. A certain amount of toe-in is necessary to promote ease of steering, but can be carried to a point such as to be detrimental, causing undue wear on the tires, which is especially the case with balloon tires.

Frequently cars adjusted with the proper toe-in when new have the toe-in changed or actually reversed to a toe-out by the axle or tie rod being bent in various ways while in use. This of course is highly detrimental both to steering and to tire wear, and should be checked up and remedied at the first opportunity.

It is hard, however, to determine the proper toe-in by the naked eye, and the ordinary means for gaging the toe-in by a tape or similar measure as is commonly used, is inadequate, since it is hard to adjust such measure with sufficient accuracy to insure proper results.

The principal object of my invention therefore is to provide a device for automatically recording the exact amount of toe-in (or the reverse) which the wheels may have, and for enabling the test to be carried out under conditions substantially the same as when the vehicle is travelling along the road.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, 1 and 2 denote smooth faced drums of a certain diameter and width of face, spaced apart between centers the same as the standard gage of automobile wheels.

Figure 1:
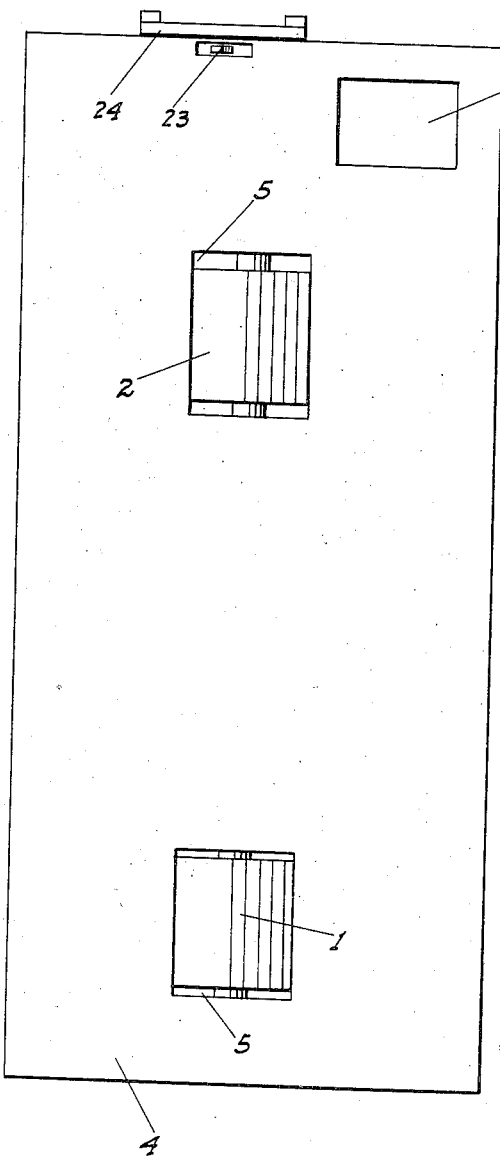
Fig. 1 is a top plan view of the structure.
Figure 2:
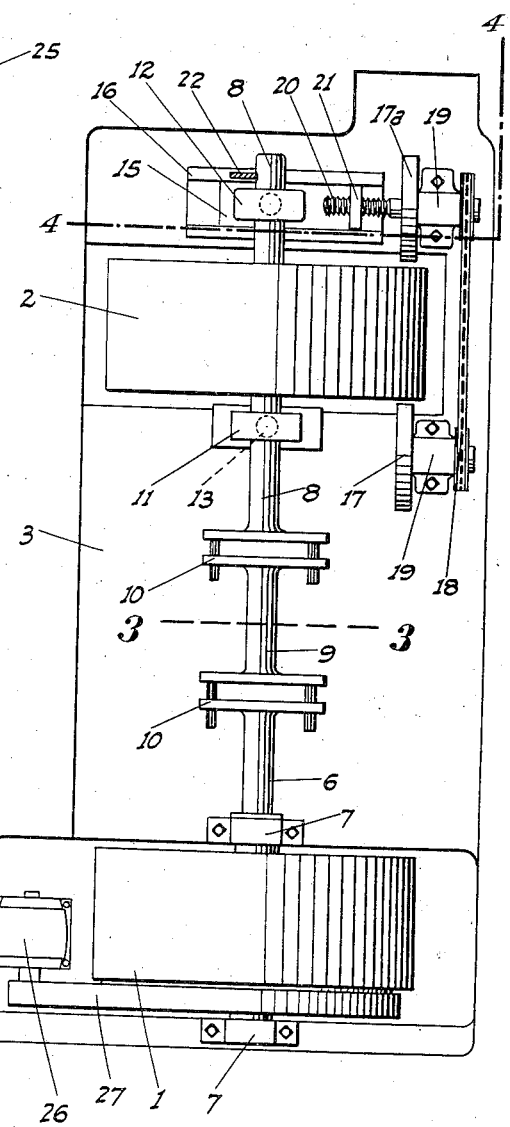
Fig. 2 is a similar view but with the floor or cover plate removed.
Figure 3:
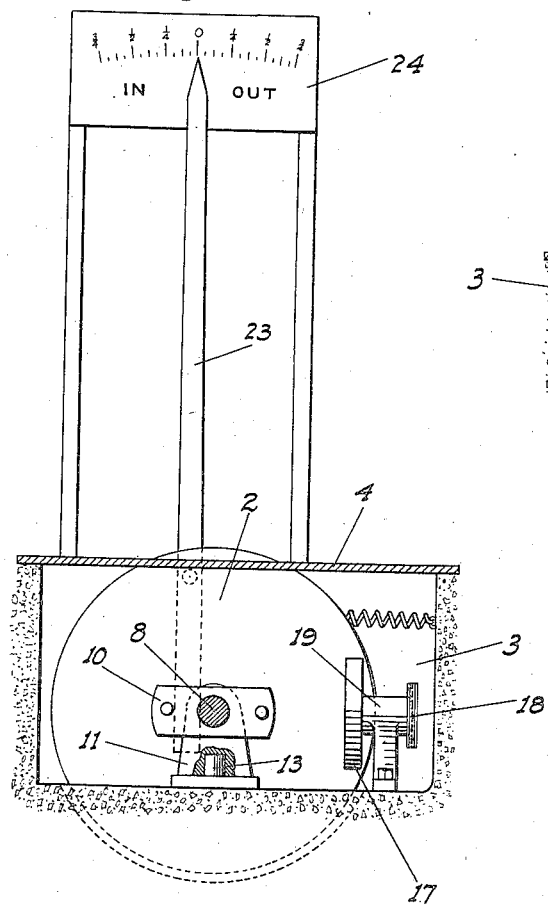
Fig. 3 is a transverse section on the line 3—3 of Fig. 2.
Figure 4:
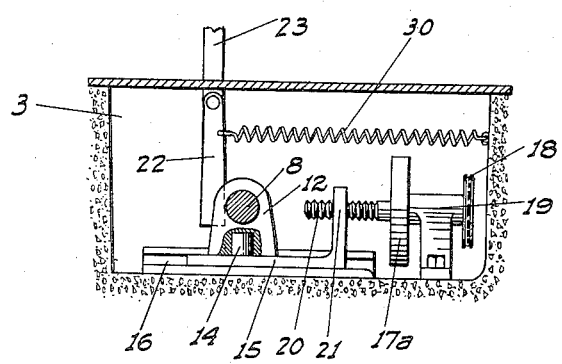
Fig. 4 is a similar view on the line 4—4 of Fig. 2.

These drums are set in a pit 3 sunk in the floor of the garage or other place where tests are to be carried out, the pit being covered by a level plate 4 having openings 5 through which the drums project slightly, as shown in Fig. 3.

The drum 1 is fixed onto a shaft 6 journaled in bearings 7 between which the drum is immovable axially. The drum 2 is splined onto a shaft 8. The shafts 6 and 8 are connected in driving relation to each other by means of an intermediate length of shaft 9 and flexible or universal joints 10 of special design interposed between said shaft 9 and the shafts 6 and 8. The shaft 8 is slidably journaled in bearings 11 and 12 which are spaced apart a sufficient distance to allow a certain axial sliding movement of the drum 2. The bearing 11 is mounted on a vertical pivot 13 which is rigidly fixed against movement. The bearing 12 is mounted on a similar pivot 14 which in turn is mounted on a plate 15. This plate is slidably mounted for movement in a direction at right angles to the normal axial line of the drum in a fixed slide 16.

Mounted adjacent the side periphery of the drum 2 are friction wheels 17 and 17ª connected in driving relation with each other by a chain drive 18 or the like.

These wheels are mounted in fixed bearings 19 and are normally spaced somewhat from the opposite side faces of the drum. The center of the friction wheel 17ª is alined with the plate 15 and said wheel is mounted in connection with a screw 20 which is threaded through a lug 21 projecting through from the adjacent end of the plate 15.

The shaft 8 projects beyond the bearing 12, the lower end of a vertical pivoted arm 22 bearing against one side of the shaft. The upper portion of this arm, above the plate 4 is formed as an indicating finger 23 which reads against a graduated dial board 24 mounted a predetermined distance above said plate. The members 22 and 23 may be made as a single piece in a common vertical plane or they may be offset from each other as shown so that the board 24 may be located some distance one side of the drum 2.

A window 25 is preferably provided in the floor plate 4 outwardly of the drum 2 and over the adjacent friction wheel 17a, so that the operator, if he desires, may see the working of said wheel.

The drums are driven at slow speed by suitable means, such as a motor 26 connected to the drum 1 by a belt drive 27.

Figure 5:
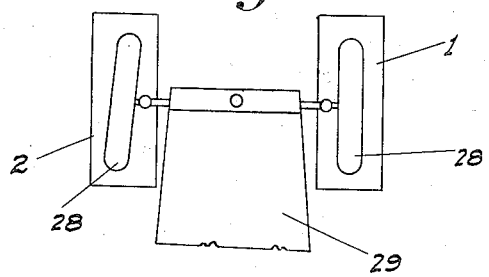
Fig. 5 is a fragmentary diagrammatic view showing the initial setting of the axles on the revolving drums.

In operation the front wheels 28 of the automobile to be tested are driven onto the drums 1 and 2 so that the axes of the wheels and drums are vertically alined. The rear end of the car is then jacked up under the differential in such a manner as to practically cause the car to be pivoted at its rear end so that the front end may swing sideways. The steering wheel of the car is then turned and held so that the wheel on the drum 1 will be parallel thereto, as shown in Fig. 5, thus concentrating on the toe-in of both wheels at the wheel which is on the drum 2.

The motor is then started up, being arranged to run in that direction which will rotate the drums so that the wheels 28 turn in the same direction, as when actually engaged with the road.

The tendency for the drum 2 is then to shift axially in one direction or the other, depending on whether the wheel resting thereon toes in or out.

Figure 6:
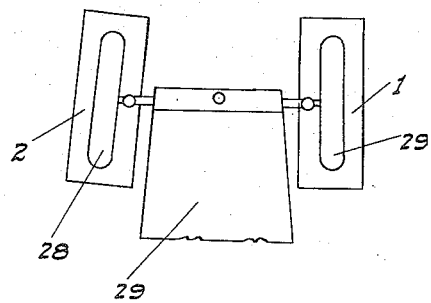
Fig. 6 is a similar view showing the ultimate position assumed by the recording drum.

Assuming that the wheel toes in as shown in the present instance, the drum 2 will move away from the drum 1 which is immovable, until it engages the friction wheel 17a. This wheel then rotates, causing the screw 20 to turn. This in turn causes the plate 15 to move lengthwise and will of course cause the drum 2 and its shaft 8 to assume an angle to its original position. This axial movement of the drum, and the consequent rotation of the friction wheel and the movement of plate 15, will continue until the drum 2 assumes a position parallel to the wheel 28 thereon, as shown in Fig. 6. When these conditions obtain the tendency for the drum to move axially will be lacking and the drum will merely rotate freely between the friction wheels 17 and 17a, except possibly for a little weaving back and forth, due to the freedom of lateral movement of the car.

With this angular movement of the drum 2 and shaft 8, the shaft recedes from the arm 22, but the latter will follow up the shaft on account of a tension spring 30 which is connected thereto, and pull said arm constantly against the shaft. The finger 23 will therefore move along the board from the neutral or zero mark until it points to a graduation thereon on the toe-in side of said zero mark.

When the finger moves as far as it shows any tendency to go, the operator stops the motor.

Corrections if necessary are then made by the usual methods employed, without removing the wheels from the drums. The latter are then again rotated to make a final test of the wheel alinement, or so that the finger 23 points to the zero mark on the scale.

As before indicated, when the drums are parallel to each other, the finger 23 points to the zero mark, and any wheels turning on the drums and causing the latter to run thus parallel will have the correct amount of toe-in. This does not mean that the wheels themselves are running parallel, but that they are rotating without any side friction on the drums with which they contact, and which correspond to the road.

The graduations on the board 24 while representing fractions of inches are of course spaced apart considerably greater than their natural size, but are proportioned relative to the movement of the drum so as to give accurate results.

The large size of these graduations is of course a benefit rather than a detriment, since it enables adjustments to be made to within a very small fraction of an inch.

If the wheels toe-out or are too nearly parallel, the drum 2 will automatically shift axially in the opposite direction, causing the wheel 17 to be engaged and causing an angular movement of the drum in the direction opposite to that above described.

This in turn causes the shaft 8 to bear against and press the arm 22 so as to move the finger 23 in the opposite direction across the board.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device for indicating the toe-in of a vehicle wheel including a driven element arranged to support one wheel of the vehicle, indicating means, and means between the indicating means and the driven element for causing the extent of misalinement of the wheel in a plane longitudinally of the vehicle to be automatically indicated when said element is driven, and the wheel is supported thereon in a predetermined position.

2. A device for indicating the toe-in of a vehicle wheel including a driven element arranged to support one wheel of the vehicle, means causing the element when driven to move to a position parallel to the wheel when said wheel is supported thereon in a predetermined position, indicating means and means for actuating said indicating means by such movement of the element arranged to indicate the extent of variation of the wheel from a predetermined plane longitudinally of the vehicle.

3. A device for indicating the toe-in of a vehicle wheel including a driven element arranged to support one wheel of the vehicle, with its axis in substantial alinement with that of the drum, means for supporting said drum for movement longitudinally of its axis, means actuated by such movement when the wheel is supported thereon in a predetermined position for causing said drum to assume a position parallel to the wheel, indicating means for showing the extent of misalinement of the wheel relative to the longitudinal plane of the vehicle, and means operatively connecting said drum and indicating means whereby the latter is actuated upon the drum assuming such parallel position.

4. A device for recording the toe-in of a vehicle wheel including a driven drum arranged to support one wheel of the vehicle, a shaft on which the drum is mounted, bearings in which the axle is slidably and turnably mounted arranged to permit of axial movement of the drum therebetween, a rotatable screw secured against longitudinal movement applied to one of the bearings to move the same horizontally and at right angles to the shaft when the screw turns, means actuated by axial movement of the drum in one direction or the other for causing the screw to turn in one direction or the other, indicating means, and means operatively connecting said drum and indicating means whereby the latter is actuated by the turning movement of the shaft caused by such movement of the bearing.

5. A device for recording the toe-in of a vehicle wheel including a driven drum arranged to support one wheel of the vehicle, a shaft on which the drum is mounted, bearings in which the axle is slidably and turnably mounted, arranged to permit of axial movement of the drum therebetween, a rotatable screw secured against longitudinal movement applied to one of the bearings to move the same horizontally and at right angles to the shaft when the screw turns, friction wheels connected in driving relation with the screw and with each other disposed on opposite sides of the drum in normally spaced relation thereto, whereby when the drum moves axially one friction wheel or the other will be rotated to impart rotation to the screw and move the bearing, indicating means, and means operatively connecting said drum and indicating means whereby the latter is actuated upon such movement of the bearing.

6. A device for recording the toe-in of a vehicle wheel including a driven drum for supporting one wheel of the vehicle with its axis substantially parallel to the drum, means supporting said drum to allow of axial movement of the same, a shaft on which the drum is mounted, means actuated by axial movement of the drum for causing the same to assume a position parallel to the wheel when the latter is supported on the drum, whereby the shaft will be disposed at an angle to its original position; and indicating means including a pivoted pointer bearing against one face of the shaft, and a graduated dial with which the pointer co-operates.

7. A device for the toe-in of a vehicle wheel including a driven drum arranged to support one wheel of the vehicle, indicating means, means between the indicating means and the drum for causing the extent of misalinement of the wheel in a plane longitudinally of the vehicle to be automatically indicated when said drum is driven and the wheel is supported thereon in a predetermined position, and another drum to support the opposite wheel of the vehicle.

In testimony whereof I affix my signature.

GEORGE W. PRATHER.